United States Patent [19]

Belveal

[11] 4,259,182

[45] Mar. 31, 1981

[54] WASTE TREATMENT APPARATUS

[75] Inventor: Robert E. Belveal, New Iberia, La.

[73] Assignee: Houston Systems Manufacturing Co., Houston, Tex.

[21] Appl. No.: 60,844

[22] Filed: Jul. 26, 1979

[51] Int. Cl.³ .............................................. C02F 3/22
[52] U.S. Cl. .................................... 210/629; 210/220; 210/631; 210/195.3; 210/754; 210/626
[58] Field of Search ....................... 210/7, 14, 1 P, 62, 210/64, 15, 83, 84, 97, 101, 195.3, 206, 207, 208, 199, 220, 256; 261/122, 124, 77

[56] References Cited

U.S. PATENT DOCUMENTS

| | | | |
|---|---|---|---|
| 2,770,319 | 11/1956 | Hagenbook | 201/124 |
| 2,901,114 | 8/1959 | Smith | 210/62 |
| 2,999,797 | 9/1961 | Campbell | 210/62 |
| 3,047,492 | 7/1962 | Gambred | 210/7 |
| 3,118,835 | 1/1964 | Butler et al. | 210/14 |
| 3,173,866 | 3/1965 | Lefton et al. | 210/195.3 |
| 3,298,526 | 1/1967 | Valdespino | 210/220 |
| 3,398,089 | 8/1968 | Mackrle | 210/7 |
| 3,400,822 | 9/1968 | McKeown | 210/195.3 |
| 3,472,764 | 10/1969 | Culp | 210/7 |
| 3,490,700 | 1/1970 | Kern | 261/124 |
| 3,495,711 | 2/1970 | Englesson et al. | 210/195.3 |
| 3,537,583 | 11/1970 | Wahner | 210/195.3 |
| 3,579,440 | 5/1971 | Bradley | 210/62 |
| 3,608,834 | 9/1971 | MacLaren | 261/124 |
| 3,746,638 | 7/1973 | Gensmain | 210/14 |
| 3,767,051 | 10/1973 | Thompson | 210/207 |
| 3,805,957 | 4/1974 | Oldham | 210/220 |
| 3,807,565 | 4/1974 | Langston | 210/220 |
| 3,872,003 | 3/1975 | Walker | 210/14 |
| 3,907,672 | 9/1975 | Milne | 210/220 |
| 3,923,656 | 12/1975 | Krebbs | 210/220 |
| 3,992,299 | 3/1975 | Wray | 210/195.3 |
| 3,997,437 | 12/1976 | Prince | 210/220 |
| 4,008,159 | 2/1977 | Besik | 210/18 |
| 4,051,204 | 9/1977 | Muller | 261/124 |
| 4,054,524 | 10/1977 | Mackrle | 210/220 |
| 4,083,785 | 4/1978 | Bernard | 210/195.3 |
| 4,100,071 | 7/1978 | Beurer | 210/220 |
| 4,146,471 | 12/1976 | Wyness | 210/220 |
| 4,167,479 | 9/1979 | Besik | 210/14 |

FOREIGN PATENT DOCUMENTS

| | | | |
|---|---|---|---|
| 2545706 | 4/1977 | Fed. Rep. of Germany | 210/195.3 |
| 2757573 | 6/1979 | Fed. Rep. of Germany | 210/195.3 |

OTHER PUBLICATIONS

Cronan, *Chemical Engineering*, "Treaten Counters High BOD Waste Stream", Apr. 1957, p. 186.

*Primary Examiner*—Ernest G. Therkorn
*Attorney, Agent, or Firm*—Keaty & Garvey

[57] ABSTRACT

A waste treatment apparatus provides a cylindrical vessel adapted to receive a waste water flow therethrough to be treated. The vessel provides an aeration chamber at the outer peripheral portion thereof, with a desirable generally helical flow being generated by aeration bubbles striking angularly deposed baffle plates. A clarifier is provided at the central portion of the cylindrical vessel for clarifying a liquid which enters the clarifier from the aeration chamber. The clarifier comprises a first settling chamber and a second decant chamber through which clear water is collected and transmitted to a chlorination chamber for subsequent discharge. The angularly deposed baffle plates are mounted in the upper portion of the aeration chamber and aid in spinning waste water in a circular or curved path. Likewise, a pair of aeration diffusers mounted in the lower portion of the aeration chamber near the center of the cylindrical vessel move waste water to be treated upwardly and outwardly in a circular path. The combination of the diffusers and the baffles move the waste water in a generally helical path for prolonged contact time and improved mechanical masceration. Additionally, the helical path thus generated tends to move solids away from the clarifier entrance thus further enhancing the separation of solids from the decant liquor.

69 Claims, 13 Drawing Figures

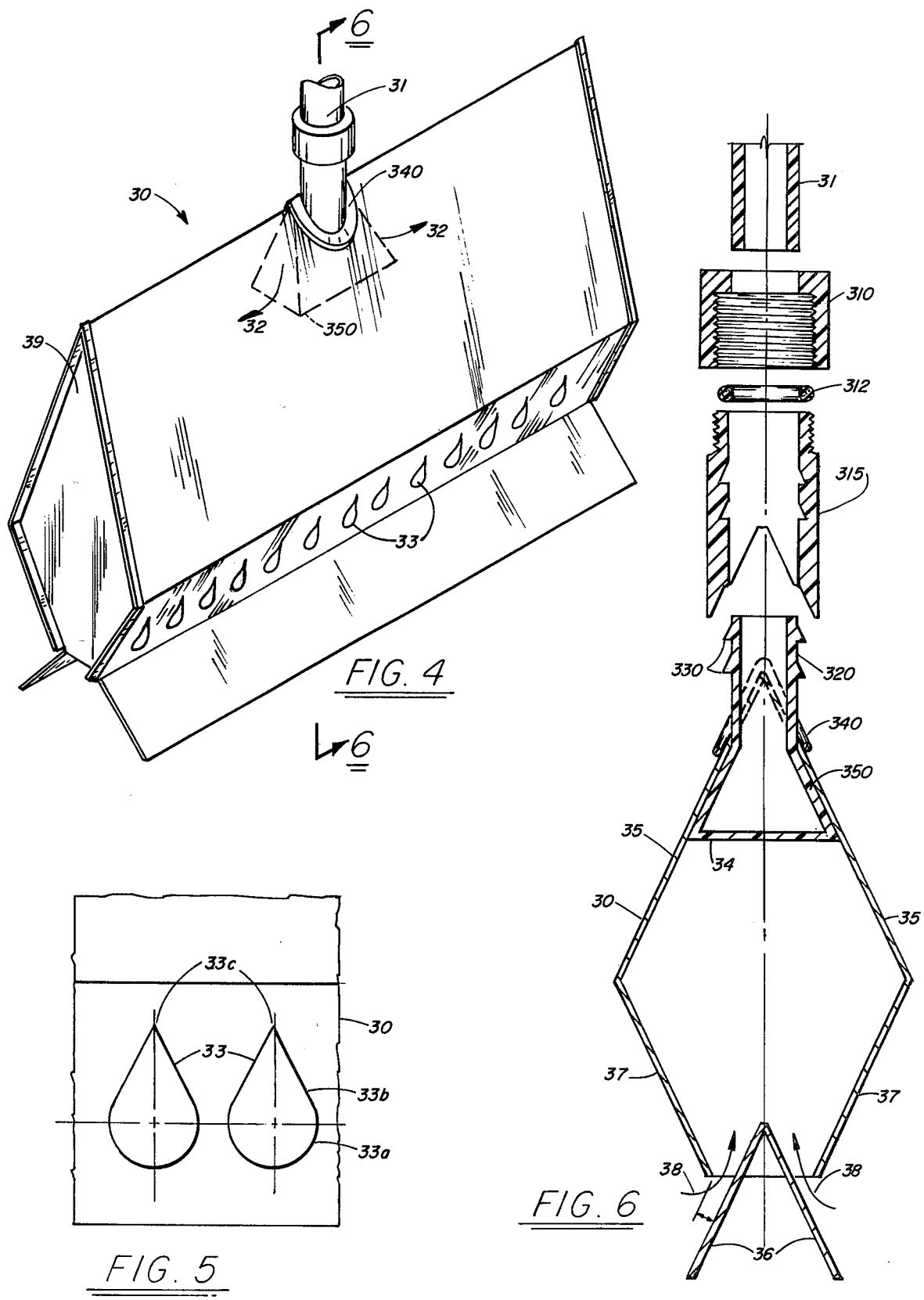

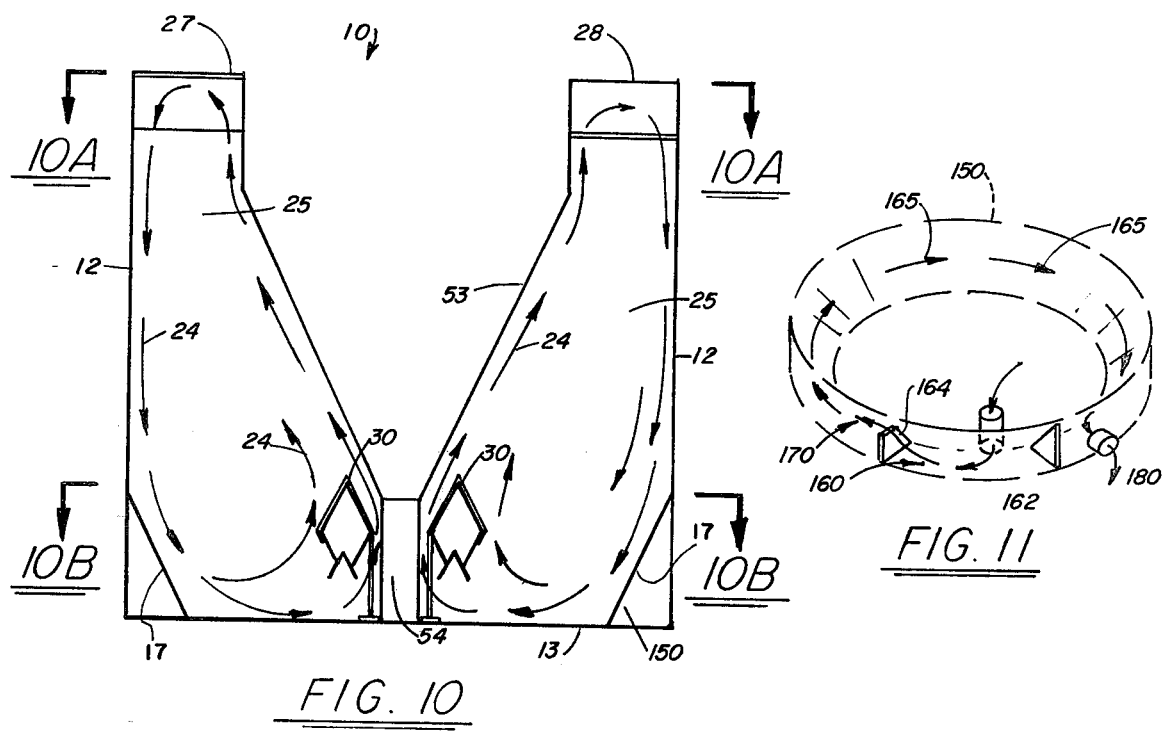
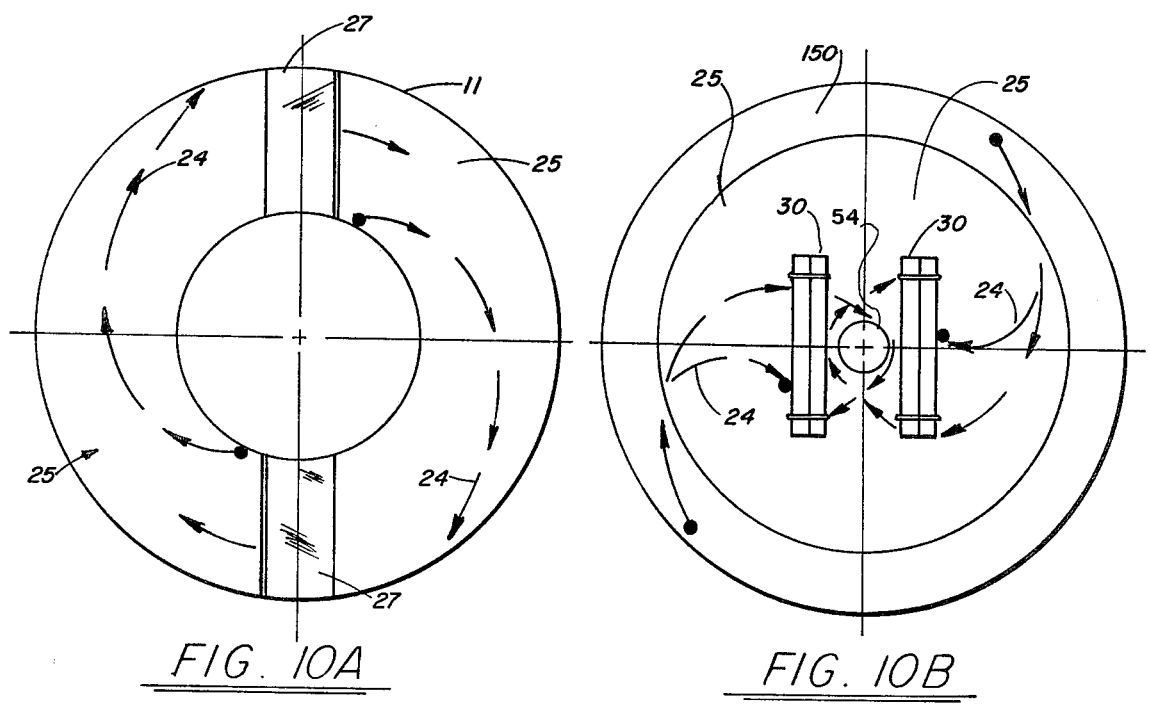

WASTE TREATMENT APPARATUS

BACKGROUND OF THE INVENTION

1. Field of the Invention

The present invention relates to waste treatment systems and especially those waste treatment which are packaged or containerized units. Even more particularly, the present invention relates to an aerated waste treatment apparatus in which air flow provides hydraulic drive of the treatment apparatus and combines with preferably a pair of baffles to move waste to be treated in a helical path within a cylindrical vessel.

2. General Background and Prior Art

In the treatment of waste, there is often utilized a containerized or packaged sewage treatment plant which treats a received waste product on a continuous basis.

In the marine industry for example, there is utilized a packaged sewage treatment plant which can be used on ships, oil rigs, and like installations. Such sewage treatment devices usually receive flow intermittently and must threat the flow in order to meet ecological and other marine standards.

It is desirable that waste be treated such as sewage in an economical way utilizing as little energy as possible and as few moving parts as possible.

It would also be desirable that a minimum of sludge removal would be required since the sludge disposal presents an extra problem.

It would further be appreciated that the settling of sludge on any parts of the apparatus would present a sludge removal problem. Further, the accumulation of sludge within the unit would produce an undesirable possibly corrosive attack on the unit itself. An accumulation of sludge within the unit further results in a deterioration of the treatment process.

It would be desirable that a sludge treatment apparatus produce a total homoginization of the fluids received from the waste stream in order that they be probably bio-degraded. Waste entering the unit would normally be heterogeneous in nature, containing solid waste material as well as some liquid material. A breakup of this material is necessary in order that it be treated properly.

In aerated treatment systems, a problem is faced in that a clogging of the aeration assembly which provides bubbles to the unit will cause a degeneration of the treatment process or in fact a total stoppage of air flow to the vessel, transferring the process from aerobic to an anaerobic thus removing any treatment capability. It would be desirable that the aeration unit or air diffuser be of a nature which would reduce or prevent clogging by solid material which enters the unit.

A further problem seen in waste treatment devices of this type is that of chlorination. Chlorination normally must be provided to the unit as needed and not on a continuous basis. If chlorine is constantly provided to the unit it will be appreciated that over chlorination and waste of chlorine will be seen when low flow occurs. Conversely, high flow periods would provide an under chlorination and the ineffective killing of microorganisms before waste water is discharged from the unit. It would be desirable that a balanced system be provided for chlorinating any effluent material based on the actual volume of fluid which was to be chlorinated within the given time.

3. General Discussion of the Present Invention

The present invention solves these prior art problems and shortcomings by providing a waste treatment apparatus having no moving parts in the basic hydraulic system.

The waste treatment apparatus of the present invention provides a cylindrical vessel adapted to receive waste water flow therethrough to be treated. The vessel provides an aeration chamber at the outer periphery portion thereof with a desirable generally helical flow being generated by aeration bubbles striking angularly deposed baffle plates which are statically mounted within the aeration chamber. A clarifier is mounted at the central portion of the cylindrical vessel for clarifying a liquid which enters the clarifier from the aeration chamber through the clarifier inlet. The clarifier comprises a first settling chamber and a second decant chamber through which clear water is collected and transmitted to a chlorination chamber for subsequent discharge. The angularly deposed static baffle plates are mounted in the upper portion of the aeration chamber and aid in spinning the waste water in a circular or curved path. Likewise, a pair of aeration diffusers mounted in the lower portion of the aeration chamber near the center of the cylindrical vessel move waste water to be treated upwardly and outwardly in a circular path. The combination of the diffusers and the baffles moves the waste water in a generally helical path for prolonged contact time and improved mechanical masceration. Additionally, the helical path thus generated tends to move solids in a centrifugal fashion away from the clarifier entrance further enhancing the separation of solids from the decant liquor.

Thus, it is an object of the present invention to provide a waste treatment apparatus in which apparatus parts are provided at an angle which disallows the settling of sludge and related solids on the apparatus.

It is another object of the present invention to provide a waste treatment apparatus providing a helical flow pattern of the waste treatment stream.

Another object of the present invention is to provide a waste treatment apparatus having a constant scrubbing action which prevents sludge accumulation and the resulting deterioration of the treatment process.

Still another object of the present invention is to provide a waste treatment apparatus having a centrifugal motion of fluids within the treatment vessel combined with a central clarifier, the centrifugal force tending to move solids and other undesirable suspended material away from the clarifier reducing opportunity to enter the clarifier thereby improving the mechanical separation of the solid/liquid waste stream.

It is another object of the present invention to provide an air diffuser which produces a bubble stream having a high surface area.

It is another object of the present invention to provide an aeration diffuser adapted to disallow the accumulation of sludge or other undesirable deposits within the diffuser assembly, and to disallow the clogging of bubble generating orifices by waste solid material.

Still another object of the present invention is to provide a waste treatment apparatus which eliminates the need for sludge removal and further sludge treatment.

Another object of the present invention is to provide a chlorination chamber which chlorinates waste stream based on the volume of waste stream effluent.

Still another object of the present invention is to provide a chlorine contact chamber which confines effluent and chlorine for concentrated chlorine contact prior to allowing a mixing of the chlorine and most recent effluent with the dilute effluent prior to a discharge from the unit.

Still another object of the present invention is to provide a waste treatment system which is gravity operated, utilizing no other energy dependent driving force.

Another object of the present invention is to provide a waste treatment system which can be retrofitted to existing installations, especially those having cylindrical tank portions.

It is a further object of the present invention to provide a waste treatment apparatus having distinct liquid operating levels which are maintained without the use of pumps or valves.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 4 is a perspective view of the diffuser assembly portion of the preferred embodiment of the apparatus of the present invention;

FIG. 5 is a partial front view of the diffuser assembly portion of the preferred embodiment of the apparatus of the present invention;

FIG. 6 is an end sectional exploded view of the diffuser shown in FIGS. 4 and 5;

FIGS. 10–10B are schematic views illustrating fluid flow and the scrubbing action of the preferred embodiment of the apparatus of the present invention; and FIG. 11 is a schematic illustration of the chlorine contact chamber portion of the preferred embodiment of the apparatus of the present invention.

DETAILED DESCRIPTION OF THE PREFERRED EMBODIMENT

Figure 1:
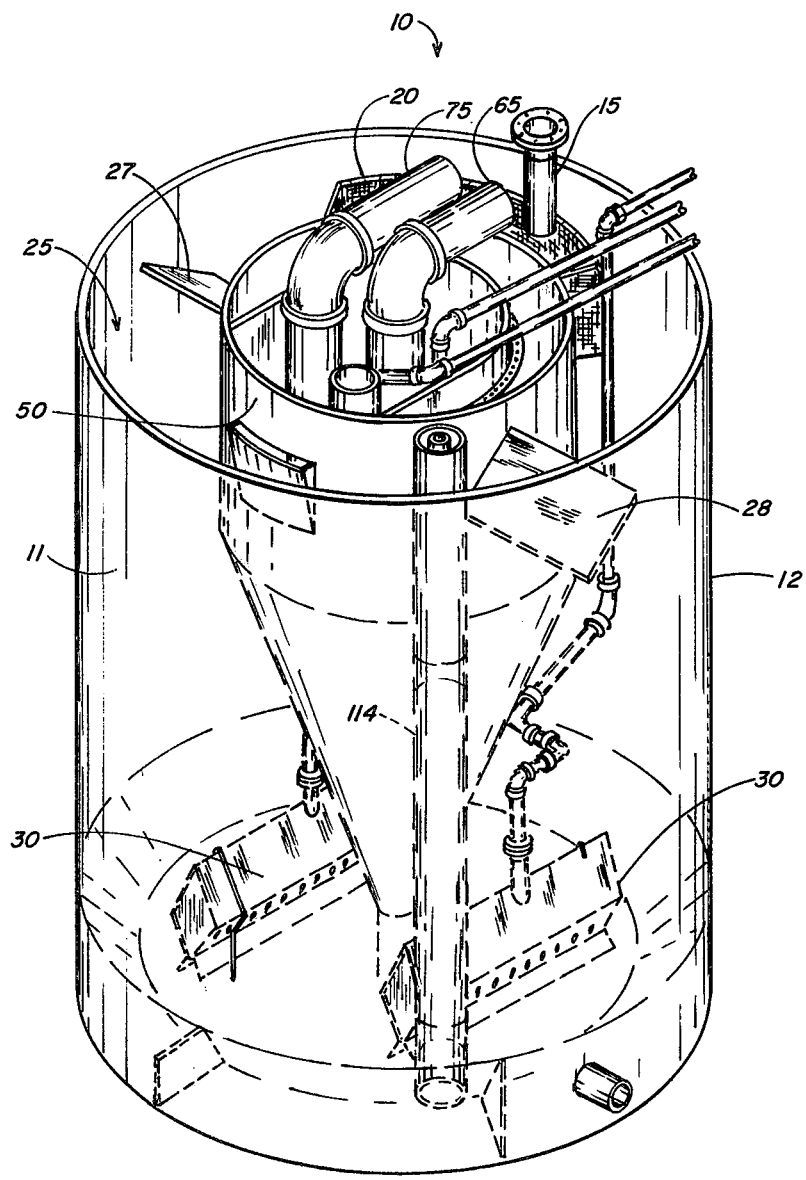
FIG. 1 is a perspective partially cutaway view of the preferred embodiment of the apparatus of the present invention.
Figure 2:
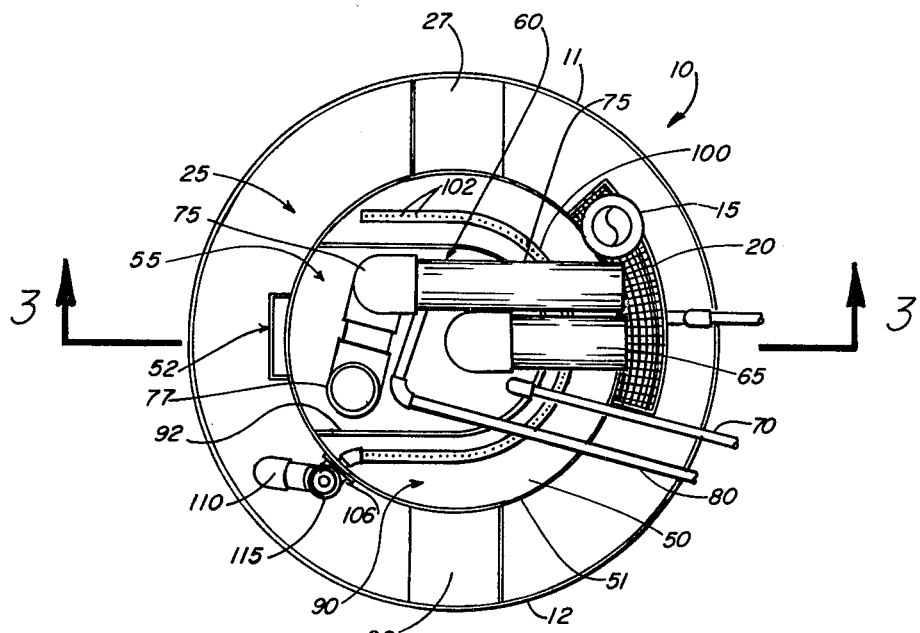
FIG. 2 is a top view of the vessel portion of the preferred embodiment of the apparatus of the present invention.
Figure 3:
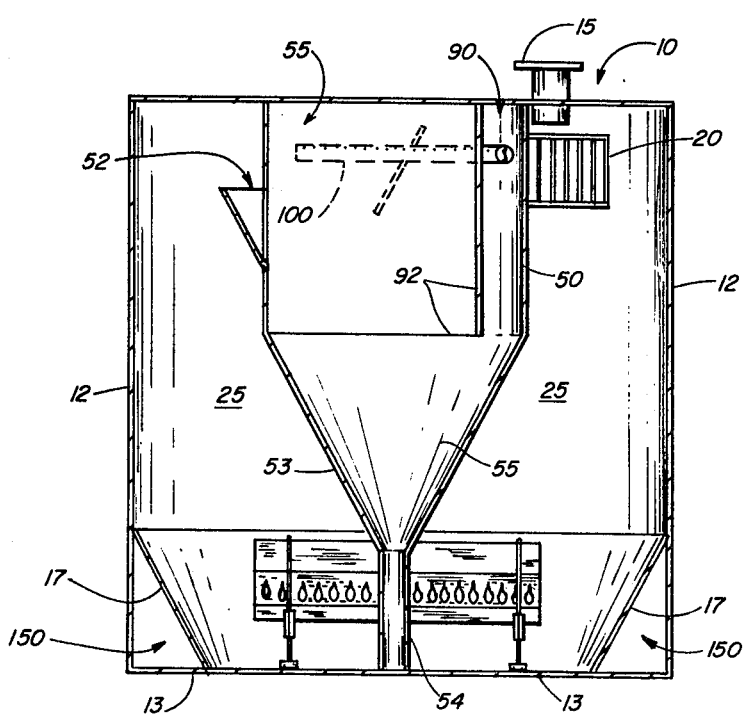
FIG. 3 is a front sectional view of the vessel portion of the preferred embodiment of the apparatus of the present invention.

FIGS. 1–3 best shows the preferred embodiment of the apparatus of the present invention designated generally by the numeral 10. Waste treatment apparatus 10 provides a waste treatment vessel 11 having a continuous cylindrical side wall 12 and a bottom 13. Vessel 11 can be for example, welded steel, concrete, plastic, fiberglass, or like construction.

Waste water to be treated is transmitted into vessel 11 through inflow pipe 15. A solids screen 20 attached at clarifier 50 removes bulk solid items from the inflowing fluids stream. Screen 20 also receives flow from recirculation lines 65, 75 and bubbles from diffuser 30 which flow and aeration help break up solids collecting in screen 20. Since location of screen 20 is at the center portion of vessel 11, process material movement (normally urged to periphery by the centrifugal force created by circular flow—see FIG. 10A) will not be inhibited.

The outer peripheral portion of treatment vessel 11 provides an aeration chamber 25. In FIGS. 10–10B, arrows 24 indicate the flow direction of waste water within aeration chamber 25. The circular flow is generated by the combination of baffle plates or baffles 27, 28 and air diffusers 30. Preferably one diffuser 30 is provided for each baffle plate 27, 28 with each baffle 27, 28 and its corresponding diffuser 30 being generally vertically aligned whereby air bubbles discharged by a given diffuser 30 will proceed upwardly striking corresponding its baffle plate 27, 28 creating a deflection of the bubbles to create the desirable circular flow. It will be appreciated that gravitational flow through vessel 11, and this above described aeration by diffusers 30 and striking baffle plates 27, 28 is the hydraulic and mechanical driving force for apparatus 10. It will thus be further appreciated that the basic hydraulic drive of apparatus 10 will operate with minimum energy requirement and no moving parts, being a paragon of simplicity.

The uppermost portion of aeration chamber 25 provides at least a pair of baffles 27, 28 which are angularly deposed with respect to vessel 11, and generally vertically placed above an air diffuser 30 with air bubbles discharged by diffuser 30 rising to strike baffle 27 or 28.

Figure 7:
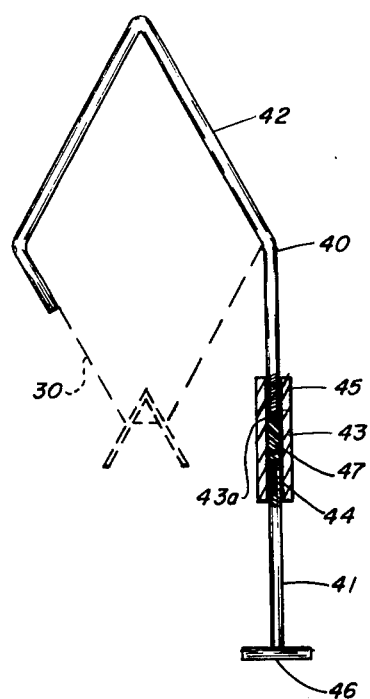
FIG. 7 is a detail view of the hanger portion of the preferred embodiment of the apparatus of the present invention as used with the diffuser as seen in FIGS. 4–6.
Figure 8:
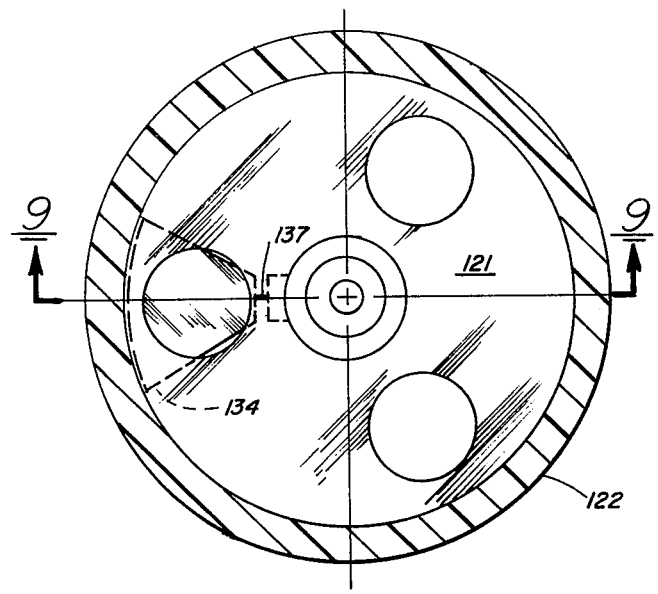
FIG. 8 is a top sectional view of the chlorination valve assembly portion of the preferred embodiment of the apparatus of the present invention.

The lowermost portion of aeration chamber 25 provides a pair or more of air diffusers 30 (preferably one air diffuser is provided for each baffle and mounted generally thereunder). Air flow upwardly thus strikes its corresponding baffle to produce a shear and produce a desired helical flow pattern as will be discussed more fully hereinafter. The construction of air diffusers 30 will be discussed more fully hereinafter. Each air diffuser 30 is mounted to vessel 11 by hanger assemblies 40 as best shown in FIG. 7.

FIGS. 10–10B schematically illustrate the fluid flow generated by diffusers 30 and baffles 27–28 in combination with the wall construction of vessel 11. In FIG. 2, two diffusers 30 are illustrated and fluid flow is generally schematically shown by arrow 24. Note that fluid flow proceeds upwardly in a direction along the walls of cone 53 and proceeds to the surface of vessel 11 where it contacts baffles 27, 28. Since baffles 27, 28 are angularly deposed as illustrated in FIG. 1, will quickly become circular at the surface as indicated in FIG. 10A. However, in combination with the circular flow as shown in FIG. 10, there will be a vertical circular flow as shown in FIG. 10. The combination it will be appreciated is a helical flow which will provide for an extended breakup path for solids which enter aeration chamber 25. The helical pattern will in fact be a double intertwined helix produced by a pair of diffusers 30.

FIG. 10B illustrates the scrubbing action at pillar 54. Since fluid flow will proceed downwardly along side walls 12 and along chlorination walls 17, it will move inwardly toward pillar 54 and under diffusers 30. A washing action or scrubbing action around pillar 54 will be achieved as indicated schematically in FIG. 10B. This is important as it prevents the accumulation of sludge or other solid material on the bottom 13 of vessel 11 as is desirable. The accumulation of sludge is not desirable, as it is an object of the present invention to provide a treatment apparatus which operates by removing all sludge material by microbiological activity. With the present invention, no sludge drawoff line is needed or provided since the microorganisms will dispose of all solid material which enters the unit and any solid material which might be recirculated from the clarifier to the aeration chamber 25.

It will also be appreciated that the circular flow as shown in FIG. 10A will produce a centrifugal force that moves the heavier suspended solids away from the clarifier opening into the peripheral side wall 12. This reduces the opportunity for solids to enter opening 52 and clarifier 50. Such centrifugal motion thus improves the mechanical separation of the undesirable solid elements from the waste stream. The helical flow produced as above described also provides for a total homoginization of the fluids enhancing the total bio-degradation thereof.

The central portion of treatment vessel 11 provides a clarifier 50. Clarifier 50 commprises, generally, a settling chamber 55 and a decant chamber 90. A clarifier piping assembly 60 is also provided which piping assembly 60 comprises generally a settable solids recirculation line 65, air lift supply line 70, floating solid recirculation line 75, and a second air lift supply line 80. Air lift supply lines 70, 80 are used respectively with settable solids recirculation line 65 and floating solid recirculation line 75.

Clarifier 50 has an outer cylindrical clarifier wall 51 and provides a clarifier inlet 52 through which fluid will move from aeration chamber 25 into clarifier 50. Clarifier settling chamber 55 is generally cylindrical in shape having a lower generally conical section 53 which may be supported by pillar 54 as seen best in FIG. 3.

As will be discussed more fully hereinafter, the lower and outermost portion of vessel 11 provides a chlorine contact chamber 150. Chlorine contact chamber 150 is generally triangular in section and circumscribes the entire periphery of vessel 11. In FIG. 3 it can be seen that a section of chlorine contact chamber 150 is formed by a portion of side wall 12, a portion of bottom 13, and chlorine chamber wall 17, which is angularly deposed with respect to bottom 13 at an angle of preferably 62 degress or larger. This degree of inclination prevents the accumulation of settable matter upon wall 17 during operation of the unit. Other surfaces on the unit are provided having an angle of preferably 62° to likewise prevent the accumulation of settable solids thereupon. Note for example the angular slope of clarifier cone 53 as well as the side walls of diffuser 30 as will be discussed more fully hereinafter. All of these surfaces as well as the chlorine chamber wall 17 are provided of an angle of at least 62° with the horizontal to prevent the accumulation of solid during operation as is desirable. Sewage for example has an angle of repose of sixty degrees (60°) and will settle on surfaces having that or lesser angular orientation. Further, this angular orientation benefits flow in a helical pattern as seen in FIGS. 10-10B.

Decant chamber 90 is provided on the outside portion of clarifier 50. Ring baffle 92 separates clarifier settling chamber 55 from decant chamber 90. Note that decant chamber 90 receives only clear water which does not contain any settable matter (which settles to the bottom of cone 53) and also does not contain any floating matter (which is collected at skimmer cup 77) of floating solids recirculation line 75. Flow into decant chamber 90 will generally be in a direction and under ring baffle 92 from clarifier settling chamber 55.

Within decant chamber 90 is provided a clear liquid collector pipe 100. Collector pipe 100 would be perforated for example with a plurality of openings 102 being provided therein. Thus, it will be appreciated that fluid will be collected around clear liquid collector pipe 100 which will be essentially clear and not contain any settlable or floating matter. Flow collected within pipe 100 will be transferred by gravity as the level in vessel 11 increases due to the constant or intermittent addition of waste into vessel 11. Clear liquid leaving collector pipe 100 will be discharged through outflow opening 106 through transfer loop 110 to chlorination valve 120.

A weir invert 112 is provided in transfer loop 100 (See FIG. 9) which determines the effective surface level in vessel 11 and thus the operating level of the unit. An outfall line 114 discharges fluid leaving weir invert 112 downwardly towards chlorination contact chamber 150. During the downward fall from weir invert 112 to chlorine contact chamber 150, fluid falling will activate chlorine dispensing valve 120 as will be described more fully hereinafter. Once fluid has been chlorinated by valve 120, it will be retained for a period of time within chlorine contact chamber 150.

Contact chamber 150 (See FIG. 11) provides a primary chlorination chamber 160 and an effluent reservoir 170 which are separated by full baffle 162 and half baffle 164. After fluid is discharged into chlorine contact chamber 150 through outfall line 114, it will travel generally in a peripheral circular path around the side of vessel 11 through chlorine contact chamber 150 with half baffle 164 determining the level of fluid within chlorine contact chamber 160 depending on the level of half baffle 164 upper surface.

The second portion of chlorine contact chamber 150 is effluent reservoir 170 which level will be controlled by the invert of discharge port 180.

Initial discharge flow from outfall line 114 enters primary chlorination chamber 160. In chamber 160, (a concentrate of chlorine having been added) microorganisms including pathenogens are killed. It will be appreciated that a first generally smaller chamber 160 retains this smaller amount to perform the disinfectant function, since a high chlorine concentration is retained in chlorination chamber 160.

In effluent reservoir 170, a detention of for example thirty minutes, is achieved for enchanced to complete microbe kill.

The construction of air diffuser will now be discussed more fully. FIGS. 4–7 best show the construction of air diffusers assembly 30. Each diffuser assembly 30 provides an air inflow 31 with the air flow being generally shown by the arrows 32 in FIG. 4. Each air diffuser provides a baffle 34 which prevents any short circuiting of air directly to the openings 33 immediately adjacent inflow 31. Diffusers 30 provide upper side walls 35 and lower side walls 37 which are angularly deposed with respect to one another to form a "diamond" cross-sectional shape. Side walls 35, 37 preferably form angles with the horizontal of approximately 62°. It has been found that the angle of 62° prevents the accumulation of any solid matter or other settlable material upon (interior or exterior) side walls 35, 37, thus keeping all solid matter in the suspension to enhance mechanical breakup and thorough waste stream treatment.

A diffuser rib 36 is provided which is attached to the endwalls 39 of diffuser 30. Each diffuser 30 provides end walls 39 to thus sealable contain air within diffuser 30 only allowing its escape through air discharge openings 33.

Air discharge openings 33 are tear drop shaped and have a lower semicircular section 33a and an upper pointed section 33b. The uppermost elevational point of each opening 33 is indicated as the point 33c in FIG. 4. The openings 33 so provided, allow the smallest bubble size possible to escape from diffuser assembly 30, thus providing for a fine bubble which maximizes air surface area and thus contact surface with the fluid being treated thereby enhancing the growth rate of microorganism necessary for biological treatment. This enhancement is a result of higher oxygen dissolution rate produced by the smaller bubble/larger surface area.

In FIG. 6 there can best be seen the detailed construction of diffuser 30. At the uppermost portion of FIG. 6 there can be seen air inflow 31 which connects to compression bushing 310. Also seen is a compression ring which fits in between coupling 315 and compression bushing 310. Note that bushing 310 and coupling 315 are threaded to threadably attach during operation. In openings provided through bushing 310 through which inflow 31 will attach with the assembly being generally shown in FIG. 4. Coupling 315 connects to baffle tube 350. Baffle tube 350 provides an upper tube 320 and a lower baffle 34 section which are integrally attached. Baffle section 34 as best seen in FIG. 4 is designed to prevent short circuiting of air flow from inflow 31 to openings 33. The tube 320 portion of baffle tube 350 provides a plurality of annular projecting ribs 330 which cooperate with corresponding annular grooves of coupling 315 as best seen in FIG. 6.

A suitable gasket 340 of neoprene for example, is provided which fits between the lower portion of coupling 315 and above the upper wall 35 of diffuser 30. It will be appreciated that the parts above described are assembled by first placing baffle tube within diffuser 30 and up through an opening provided at the intersection of upper walls 35 as best seen in FIG. 6. Thereafter, gasket 340 is placed over the tube 320 portion of baffle tube 350 and coupling 315 is pressed thereonto with the grooves of coupling 315 as seen in FIG. 6 attaching to and interlocking with the projecting ribs 330 of baffle tube 350. The connection of coupling 315 with air inflow 31 is achieved using compression bushing 310 and compression ring 312. Ring 312 would be placed on the upper portion of coupling 315 with compression bushing threadably attached thereto after inflow line 31 was placed within compression bushing 310 as illustrated in FIG. 4. A threaded engagement thereafter is made of compression bushing 310 onto coupling 315 to complete the connection.

Note from an inspection of FIG. 6 at the lower portion thereof, that arrows 30 indicate the general flow of fluids through the lower portion of diffuser 30. Diffuser rib 36 allows flow to proceed upwardly through the openings provided in the lower portion of diffuser 30 as shown by arrows 38. A clearance indicated by the letters "CL." is provided which preferably is smaller than the diameter of openings 33 at their smallest diameter. This would prevent the entry of any solids into diffuser 30, which would be large enough to clog openings 33. The diffuser rib 36 would preferably be of a 62° angular orientation, as is the case with side walls 35, 37 as above described.

Hanger assemblies 40 are best seen in FIG. 7. Each hanger provides a hanger foot 41 and a hanger arm 42 which are attachable at bushing 43. Bushing 43 provides right and left handed internal threads 43a while hanger 41 and hanger arm 42 provide external threads 44, 45, right and left handed respectively, for threaded engagement with and level adjustment through rotation of bushing 43. A base 46 on hanger assembly allows hanger assembly 40 to be attached to bottom 13.

Hanger foot 41 would be of for example mild steel with bushing 43 of brass, hanger arm 42 of stainless steel and ring 47 would be phenolic. The above construction has been found to prevent electrolyses.

Clarifier piping assembly as aformentioned provides 4 pipes as listed below:
 65: settable solids recirculation line;
 70: air lift supply line for settable solids;
 75: floating solids recirculation line; and
 80: air lift supply for floating solids.

Piping assembly 60 provides for the introduction of air into clarifier 50 for the recirculation of solid material collected within clarifier, both material which has settled and material which is floating. Settable solids recirculation line 65 provides an inlet at the lowermost portion of clarifier cone 53 which recirculation line moves upwardly and provides a discharge immediately above aeration chamber 25. Cooperating with settable solids recirculation line 65 is air lift supply 70. It will be appreciated that air injected at the lowermost portion of settable solids recirculation line 65 will produce a flow in recirculation line 65 moving settled solids upwardly and discharging them back into screen 20 and then aeration chamber 25 for additional break-up and treatment. Recirculating into solids screen 20 utilized recirculation to aid in the breakup of solids collecting in screen 20 from inflow pipe 15.

Floating solids are removed from clarifier 50 by flow into skimmer cup 77. Those fluids moving into skimmer cup 77 are discharged as air lift supply line 80 attaches to the lowermost portion of floating solids recirculation line 75 and discharges floating solids back into aeration chamber 25 for further treatment, as above described. Skimmer cup 77 rests on the intake end portion of floating solids recirculation line 75 and is provided to enlarge the effective surface area for the collection of floating solids.

Chlorination is provided to fluid flowing from decant chamber 90 into transfer loop 110 and through outfall 114. A balanced flow is achieved based on the volume of flow leaving outflow openings 106 by means of chlorine dispensing valve 120. It will be appreciated by reading further that chlorine is only added as needed and based upon the volume of flow rather than being continuously dispensed which results in either overchlorination or underchlorinating, as is undesirable.

It will be further appreciated that a chlorine contact chamber allows a "balancing" of chlorine within the treated fluid before it is discharged from the unit to thus provide a generally constant residual chlorine content on any fluid leaving vessel 11 no matter what the incoming flow be it constant, variable, intermittent, or the like.

Valve 120 provides the valve body 122 having a valve chlorine inlet 124 which could be treaded with threads 126. Thus, a suitable pipe or tubing could be connected by threading chlorine inlet 124 which would connect with a chlorine vile or like supply of chlorine to supply chlorine to valve 120 as needed.

Figure 9:
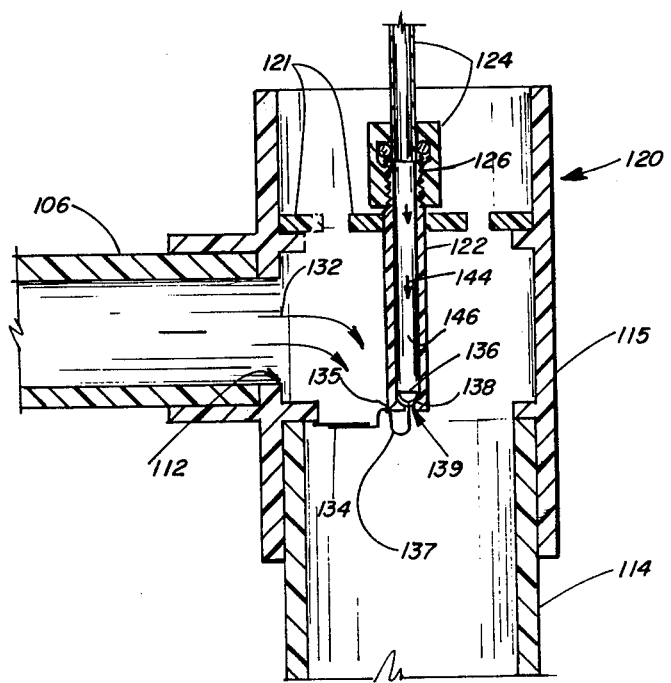
FIG. 9 is a sectional side view of the assembly shown in FIG. 8.

Valve 120 is actuated by water falling from weir invert 112 into outfall line 114. In FIG. 9 the flow of water from weir invert 112 is schematically illustrated by arrows 132. An actuator paddle 134 receives falling water 132 and pivotally moves arm 137 about pivot 135 responsive to the mass of falling water.

A mounting disc 121 is provided for attaching valves 120 in outfall tee 115. Actuator arm bracket 137 mounts actuator arm 137 to valve body 122.

Valve body 122 provides an inner bore 146 through which chlorine travels by gravity as shown by arrows 144 to valve seat 138. Normally, a valving member 136 forms a closure against seat 138 preventing any escape of chlorine from discharge opening 139. It will be appreciated that fluid flow as indicated by arrows 132 will move paddle 134 downwardly pivoting arm 137 and moving valving member 138 upwardly from its seat 138 allowing chlorine to discharge through opening 139. It will be appreciated that once a discharge of flow is completed, paddle 134 will return to its closed position as shown in FIG. 9 and valving member 136 will seat against seat 138 closing opening 139 as is desirable.

In the actual test conducted using an eighty-seven gallon prototype model of applicants waste treatment apparatus, human waste influent was provided using the excrement of four adults. In depth biological testing was accomplished on both the in process fluids and the effluent. The results of these tests demonstrated the superiority of the applicants invention over the existing state of the art. Over the test period, the primary treatment fluid contained Biological Oxygen Demand of approximately 185 mg/l, the effluent 3.0 mg/l, a reduction of 98.3%; Total Suspended Solids averaged 12.4 mg/l; Residual Chlorine 3.0 mg/l. Additionally, Dissolved Oxygen within the process chamber averaged nearly 92% of the mathematical absolute for this value based on fluid temperature and barometric pressure. The value of these tests is to demonstrate that the state of the art has now been elevated to a level which will allow substantial improvement in waste water effluents and, consequently, the quality of the receiving waters.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A waste treatment apparatus comprising
   a. a fluid container vessel having inlet means for receiving a waste water inflow, said vessel being cylindrical and providing at least circular side walls and a bottom portion;
   b. a clarifier mounted at the central portion of the said vessel said clarifier means providing decant means for removing floating solids which enter said clarifier and settlable solids removal means for removing settlable solids which enter said clarifier, said clarifier having a clarifier inlet opening allowing fluid flow between said clarifier means and said vessel;
   c. aeration means for introducing air buttles into said vessel, said aeration means being mounted on the lower portion of said vessel between said circular side walls and said clarifier;
   d. at least one angularly disposed baffle plate mounted vertically above said aeration means and extending part of the distance between the water surface and said aeration means, allowing a continuous circular fluid flow thereby around said clarifier with a portion of the air bubbles discharging from said aeration means striking said baffle plate to produce at least in part the circular flow pattern around said clarifier; and
   e. outflow means on said vessel for removing clarified water from said clarifier.

2. The apparatus of claim 1 further providing chlorination means associated with said outflow means for chlorinating water discharging from said vessel through said outflow means.

3. The apparatus of claim 2 wherein said chlorination means is flow rated to add an amount of chlorine dependent upon the volume of flow passing through said chlorination means to said outflow.

4. The apparatus of claim 3 where said chlorination means comprises:
   a. a valve;
   b. a valve actuator operating said valve to chlorinate water discharging from said vessel responsive to flow passing to said valve actuator;
   c. a chlorine conveying conduit having attachment means at its end portions for attaching a chlorine supply to said valve.

5. The apparatus of claim 4 wherein said outflow means provides an invert portion for determining the fluid level in said vessel, and said valve actuator is placed below said invert/portion.

6. The apparatus of claim 4 wherein there is provided a flow control means in said chlorine conveying conduit for controlling the flow of said chlorine through said chlorine conveying conduit.

7. The apparatus of claim 1 wherein said clarifier inlet provides guard means for preventing horizontal fluid flow from said vessel to said clarifier means.

8. The apparatus of claim 7 wherein said guard means is a baffle surrounding at least a portion of said clarifier inlet.

9. The apparatus of claim 1 wherein said settlable solids removal means is a lower cone portion of said clarifier means.

10. The apparatus of claim 9 wherein the angle of inclination of said cone is at least sixty two degrees (62°).

11. The apparatus of claim 9 further comprising recirculation line means associated with said cone portion of said clarifier means for transmitting settled solid material from the lower portion of said cone to said vessel outside of said clarifier means.

12. The apparatus of claim 9 further comprising recirculation line means of associated with said cone portion of said clarifier for transmitting floating solids to said vessel from the surface portion of said clarifier means.

13. The apparatus of claim 1 wherein said aeration means is provided at the central portion of said vessel adjacent said cone.

14. The apparatus of claim 1 wherein said baffle plate is placed at the surface portion of said vessel.

15. The apparatus of claim 1 wherein there is provided a pair of angularly deposed baffle plates and said aeration means is a pair of corresponding air diffusers each mounted respectively vertically below its corresponding baffle plate and each of said plates is cooperatively beveled to bias fluid flow in the same rotational direction.

16. The apparatus of claim 15 wherein said baffles are arranged at an angle of at least sixty two degrees (62°).

17. The apparatus of claim 16 wherein each of said baffles is provided at the approximate water surface area of said vessel.

18. The apparatus of claim 1 further comprising a peripheral slanted annular side wall at the lower portion of the said vessel continuously connecting between said circular side walls and said bottom of said vessel, defining a chlorine contact chamber and said outflow means transmits the waste water stream through said chamber.

19. The apparatus of claim 18 wherein said peripheral slanted side walls have an angle of at least sixty two degrees (62°).

20. The apparatus of claim 1 wherein said aeration means comprises:
   a. an aerator body comprising a plurality of side walls having an angular inclination of at least sixty two degrees (62°);
   b. an air inlet adapted to convey air into said air body;
   c. a plurality of tear shaped openings being provided in said body allowing air to discharge from said body through said tear shaped openings.

21. The apparatus of claim 1 wherein said clarifier comprises:
   a. a frostro-conical cone having a flow opening there into;
   b. a decant baffle mounted within said cone and surrounding said flow opening; and
   c. collection pipe means within said cone and opposite said clarifier opening for collecting clarified water within said flow means but above said cone and below the water surface of said clarifier.

22. The apparatus of claim 21 wherein said opening is provided with baffle guard means for preventing generally horizontal flow travel into said clarifier from said vessel.

23. The apparatus of claim 22 wherein said baffle guard means comprises a plurality of baffle plates surrounding said opening.

24. The apparatus of claim 23 wherein each of said plates plates has an angular mount of at least sixty two degrees (62°).

25. The apparatus of claim 23 wherein said decant baffles surrounds said clarifier openings on at least three sides.

26. The apparatus of claim 21 wherein said collection pipe means is an elongated flow conveying pipe having at least one opening therein.

27. The apparatus of claim 26 wherein said pipe is placed at a level within said clarifier below the water surface and above the lower edge of said decant baffle.

28. The apparatus of claim 21 further comprising transfer loop means for transmitting fluid within said collection pipe means to said vessel outflow means.

29. The apparatus of claim 28 wherein said transfer loop provides a vessel level defining invert.

30. The apparatus of claim 28 wherein there is further provided chlorination means in said transfer loop means for chlorinating water flowing through said transfer loop means from said collection pipe means.

31. The apparatus of claim 30 wherein further comprising chlorination reservoir means for receiving and storing at least temporarily fluid received from said transfer loop means.

32. The apparatus of claim 30 wherein said chlorination reservoir means is a chamber defined by at least a portion of the side wall of said vessel and the bottom thereof and an annular peripheral slanted side wall connecting at its edge respectively to said bottom and to said side walls.

33. The apparatus of claim 32 wherein said chamber provides at least one level defining baffle within.

34. The apparatus of claim 32 wherein there are two liquid level defining baffles within said chlorination reservoir means.

35. The apparatus of claim 34 wherein said outlfow means defines the level of at least a portion of said chlorination reservoir means.

36. A waste water treatment method comprising:
   a. introducing a waste water stream to be treated into a cylindrical treatment vessel having at least a central clarifier and a vessel outer wall, an aeration chamber being defined between the clarifier and the vessel wall;
   b. bubbling air with an aerator upwardly in the treatment vessel from the bottom portion thereof within the aeration chamber portion;
   c. deflecting the air introduced using at least one angularly disposed baffle plate placed generally above the introduced air to produce a continuous rotational flow in the vessel about the cylindrical vessel central clarifier, the baffle extending a partial distance beneath the water surface in the vessel downwardly;
   d. collecting clarified water at the central portion of the circular vessel and below the vessel water surface.

37. The method of claim 36 further comprising the step "E" of chlorinating the collected clarified water.

38. The method of claim 37 wherein in step E, the collected clarified water is chlorinated based on a prorata volume basis.

39. The method of claim 36 wherein in step D the collected clarified water is separated into decant clear water, settlable solids, and floating solids.

40. The method of claim 39 wherein there is further provided the step E of chlorinating the decant clear water.

41. The method of claim 39 wherein in step E, the decant clear water is chlorinated on a prorata flow rated basis.

42. The method of claim 36 wherein in step A, waste water introduced into the cylindrical vessel is first passed through a solids screen.

43. The method of claim 42 wherein there is further provided the step of removing floating and settlable solids from the waste water stream at the central vortex portion of the circular vessel.

44. The method of claim 43 further comprising the step of recirculating the removed settlable solids and floating solids to the circular vessel through the solids screen.

45. The method of claim 44, wherein settlable solids are removed from the clarifier by the cone portion.

46. The method of claim 44 wherein the clear water is removed from the central portion of the circular vessel through the clear water collection pipe.

47. The method of claim 36 wherein in step D, a clarifier is provided at the central portion of the circular vessel, the clarifier providing a decant chamber, a settlable solids collection cone, and a clear water collection pipe.

48. The method of claim 36 further comprising the step E of chlorinating the clarified water removed from the central portion of the circular vessel and the step F of holding the chlorinated clear water in a reservoir for a period of time before discharging it from the circular vessel.

49. The method of claim 36 wherein in step B, a pair of air diffusers are provided to produce air bubbles at the lower portion of the circular vessel.

50. The method of claim 49 wherein in step C a baffle plate is provided generally vertically above each air diffuser and air is bubbled upwardly from each air diffuser whereby it strikes and deflects off at least in part the respective angularly deposed baffle plate.

51. The method of claim 36 wherein in step B, the air is introduced at the lower central portion of the circular vessel aeration chamber with the air producing a radial fluid flow in a circular path generally upwardly, to the surface of the circular vessel, then outwardly to the vessel wall portion and thereafter downwardly to the bottom of the vessel and back to the point of introduction of the air.

52. The method of claim 51 wherein the radial pattern of air combined with the circular flow pattern produced by the deflecting baffles provides a helical flow of fluid and air within the peripheral portion of the circular vessel.

53. The method of claim 36 further comprising the step E of maintaining a substantially constant fluid level in the vessel.

54. The method of claim 53 wherein in step E, the invert is a clear water collection flow line adapted to remove clear water from the central portion of the circular vessel.

55. The method of claim 36 further comprising the step between steps B and C of microbiologically treating the waste water introduced into the circular vessel.

56. The method of claim 55 further comprising the step of chlorinating the clear water removed from the circular vessel before its discharge therefrom.

57. A waste water treatment comprising the steps of:
a. providing a cylindrical waste water treatment vessel;
b. introducing a waste water stream to be treated into the circular vessel;
c. providing a cylindrical clarifier at the central portion of the circular vessel, the clarifier having a settlable solids cone portion and a floating solids collection cup portion;
d. providing a pair of air diffuser assemblies at the bottom inner portion of the circular vessel;
e. introducing air into the circular vessel through the air diffusers;
f. deflecting the air introduced through the air diffuser assemblies laterally using baffles to produce a circular flow pattern around the periphery of the circular vessel;
g. collecting settlable solids in the collection cup portion of the clarifier;
h. collecting the settlable solids in the cone portion of the clarifier;
i. with the drawing clear water from the clarifier by gravity as waste water is introduced into the circular vessel;
j. chlorinating the clear water collected; and
k. discharging the chlorinated clear water from the circular vessel.

58. A waste treatment apparatus comprising:
a. a fluid container vessel being cylindrical and providing at least a circular side wall and a bottom portion;
b. influent opening means in said vessel for introducing a fluid waste stream to be treated into said vessel;
c. an aeration chamber within said vessel;
d. an air diffuser within said aeration chamber for aerating fluid within said aeration chamber;
e. at least one angularly disposed baffle plate mounted vertically above said aeration means and extending part of the distance between the vessel water surface and said aeration means, allowing a continuous circular flow thereby around said clarifier with a portion of the air bubbles discharging from said aeration means striking said baffle plate to produce at least in part the circular flow pattern around said clarifier;
f. a settlable solids removal cone mounted at the lower portion of said vessel, the lower portion of said cone collecting solid material from the waste stream to be treated, the uppermost portion of said cone at least in part collecting clarified water;
g. a clarifier mounted at the central portion of said vessel and generally above said cone and being surrounded at least in part by said aeration chamber, the waste stream to be treated flowing from said influent opening means to said aeration chamber and then to said clarifier;
h. recirculation line means associated with said settlable solids removal cone for recirculating solids collected within said cone to said aeration chamber;
i. effluent discharge means for discharging fluid from said vessel, the flow of fluid waste through said vessel being entirely by gravity between said influent openings means and said effluent discharge means; and
j. a transfer loop associated with said cone for receiving flowing clarified water from said cone and transmitting the clarified water to said discharge means.

59. The waste treatment apparatus of claim 58 further comprising baffle means for separating said aeration chamber from said settable solids removal cone.

60. The apparatus of claim 59 wherein said baffle means comprises at least in part said clarifier.

61. The waste treatment apparatus of claim 59 wherein said baffle means comprises a plate separating said aeration chamber at least in part from said cone, and there is provided an opening in said plate allowing fluid flow from said aeration chamber into said cone.

62. The apparatus of claim 58 wherein said transfer loop comprises at least in part a pipe having an invert portion which defines the waste stream level in said vessel.

63. The waste treatment apparatus of claim 62 wherein said transfer loop further comprises a perforated collection pipe mounted in said vessel and removed from said aeration chamber.

64. The waste treatment apparatus of claim 58 further comprising a chlorine contact chamber within said vessel and positioned to receive flow from said transfer loop.

65. The waste treatment apparatus of claim 64 wherein said discharge means is attached to said chlorine contact chamber.

66. The waste treatment apparatus of claim 64 wherein said chlorine contact chamber is a chamber mounted in the lower peripheral portion of said vessel, with said chlorine chamber circumscribing at least a portion of the periphery of said vessel.

67. The waste treatment apparatus of claim 63 wherein said perforated collection pipe is mounted in said vessel at the upper portion of said cone.

68. The waste treatment apparatus of claim 58 wherein said recirculation line means comprises a pipe connecting the lower portion of said cone with said aeration chamber and further comprises an air lift supply line attached to said recirculation line pipe at the lower portion thereof adjacent the lower portion of said cone.

69. The waste treatment apparatus of claim 58 wherein said diffuser is attached to the inner portion of said vessel, with air flow producing a circular fluid flow beginning at said diffuser progressing to the surface of waste within said vessel and thence to the outer wall portions of said vessel before returning to said air diffuser area.

* * * * *